United States Patent [19]

Yock et al.

[11] Patent Number: 4,468,325
[45] Date of Patent: Aug. 28, 1984

[54] APPARATUS FOR EFFECTING CLARIFICATION OF LIQUID PROVIDED WITH FILTER CLEANING MEANS

[75] Inventors: Lewis M. Yock, Tigard; Jack B. Burdick, Lake Oswego, both of Oreg.

[73] Assignee: Globe Machine Manufacturing Company, Tacoma, Wash.

[21] Appl. No.: 419,500

[22] Filed: Sep. 17, 1982

[51] Int. Cl.$^3$ .............................................. B01D 21/04
[52] U.S. Cl. ................... 210/408; 210/409; 210/413; 210/523; 209/257
[58] Field of Search ............ 210/407, 408, 409, 413, 210/791, 805, 523, 396, 106, 107; 209/387, 388, 490, 257; 55/294, 296, 430

[56] References Cited

U.S. PATENT DOCUMENTS

| | | | |
|---|---|---|---|
| 836,078 | 11/1906 | Bache-Wüg | 210/413 |
| 1,535,750 | 4/1925 | Tracy | 210/408 |
| 2,861,688 | 11/1958 | Harms | 210/413 |
| 3,357,567 | 12/1967 | Wake | 210/408 |

FOREIGN PATENT DOCUMENTS

| | | | |
|---|---|---|---|
| 140404 | 5/1953 | Sweden | 210/413 |
| 153853 | 3/1956 | Sweden | 210/409 |
| 16059 | of 1908 | United Kingdom | 210/413 |

*Primary Examiner*—Richard V. Fisher
*Assistant Examiner*—John W. Czaja
*Attorney, Agent, or Firm*—Kolisch, Hartwell, Dickinson & Anderson

[57] ABSTRACT

Apparatus for effecting clarification of liquid having particulate material entrained therewithin includes a filter screen and a filter-cleaning device disposed adjacent thereto operable for removing particulate material from the filter screen which has been deposited or accumulated thereon from a particulate-laden liquid discharged onto the filter screen. The filter-cleaning device includes a dispenser which is selectively positioned, in an automatic manner, relative to the filter screen to direct a fluid flow against the filter screen at variable locations thereon to impart movement to the retained particulate material relative to the filter screen. Additionally, the filter-cleaning device of the present invention includes a plurality of nozzles, which form the dispensing device, mounted on a carriage which is operable for carrying the dispensing device so that the nozzles will be presented over the filter screen in a selective, reciprocally shifting manner.

10 Claims, 7 Drawing Figures

APPARATUS FOR EFFECTING CLARIFICATION OF LIQUID PROVIDED WITH FILTER CLEANING MEANS

BACKGROUND AND SUMMARY OF THE INVENTION

The present invention relates to the clarification of liquids and more particularly to a novel method and apparatus for effecting clarification of liquids having a particulate material entrained therewithin. The apparatus utilizes a novel means for continuously and effectively cleaning a filter employed to retain the particulate material.

In many industrial, food processing, agricultural and forest products applications, it is often necessary to clarify various liquids which have become entrained with particulate material. Typical examples include hot water block heating systems, log yard run-off, stack scrubbers, reclamation of river or irrigation ditch water and filtration of glue spreaders or dryer wash downs. In all of the above processes, some type of filter mechanism or catchment apparatus is provided for removing the particulate matter from a liquid stream so that the liquid may be reclaimed for subsequent reuse. However, in all of the above processes, a significant problem remains in the continuous requirement for liquid reclamation, and also in the concomitant requirement of periodic cleaning of the mechanism or filter which retains the particulate material. Cleaning is necessary to prevent the undesireable accumulation of particulate material not only on the surface of the filter, but also to remove that material which has become lodged in the filter's interstices.

Problems attending the clarification of water in the forest products industry may be illustrated by the following example in reference to what is referred to as a "hot water block heating process". Such a process is used to soften the fibers in logs or "blocks", which have been substantially debarked, prior to the blocks being peeled into veneer by a veneer lathe. It is necessary to soften the fibers to enhance peeling, and to this end, the blocks are loaded initially into steam vats where steam in the form of hot rain saturates the logs. The water, as it falls over and saturates the blocks, becomes contaminated with foreign matter or particulate material such as bark remnants, dirt, sand, etc. In order to reclaim the water, it is necessary to direct the contaminated water to a sediment tank where the large particles float to the surface. The remainder liquid, which still includes particulate matter, is then directed to a filtering device such as a filter screen. The filter screen can become clogged and substantially inoperable after a period of time, necessitating time consuming and burdensome cleaning.

Previous attempts have been made to provide a means for cleaning filter screens, but generally involve some type of vibrating or rotating mechanisms which impart motion to the filter screen itself. Such mechanisms generally are complex, expensive and subject to mechanical inefficiencies and breakdowns.

Accordingly, it is a general object of the present invention to provide a method and apparatus for effectively and continuously cleaning a filter means, such as a filter screen, in a water reclamation process, so that the filter means does not become clogged or impacted with particulate material. To this end, the present invention contemplates a novel filter-cleaning means in which a fluid flow, preferably in the form of a spray, is continuously directed against a filter means and the particulate material retained thereon, to effect relative movement between the particulate material and the filter means thereby to "sweep" the particulate material away.

It is another object of the present invention to provide a method and apparatus in which the fluid flow directed against the particulate material originates from a dispensing means selectively shiftable relative to the filter means. The dispensing means is mounted on a carriage means which is operable for selective, reciprocal shifting relative to the filter means. By directing the fluid flow against the filter means at variable locations thereon, the entire filter area, or a substantial portion thereof, is cleaned.

It is another object of the present invention to provide a dispensing means, as described above, incorporating upper and lower nozzle means mounted on the carriage means. The upper nozzle means are disposed for directing fluid flow against the upper surface of the filter means with the lower nozzle means, also mounted on the carriage means, being mounted beneath the filter means for directing fluid flow upwardly against the bottom surface of the filter means.

The net effect of the construction as described above is to "sweep" particulate material on top of the filter means downstream therefrom while the lower nozzle means, oriented to direct fluid flow substantially vertically upwardly, dislodges particulate material which may have become lodged or impacted within the interstices of the filter means. By continuously reciprocally shifting the dispensing means, particulate matter is continuously swept away and dislodged from the filter means.

Still another object of the present invention is to orient the nozzle means in a predetermined manner relative to the filter means. Elaborating further, the filter means is slightly tilted downwardly in the downstream direction, and the upper nozzle means are directed at an angle or obliquely relative to the filter means so that as particle-laden liquid is discharged onto the filter means, it tends to flow downwardly toward a discharge end with the particulate material, retained on the filter means, also being moved downstream due to the reciprocal impingement action of the upper and lower nozzle means.

These and additional objects and advantages of the present invention will be more particularly understood after a consideration of the drawings and the following detailed description of the preferred embodiment.

DETAILED DESCRIPTION OF THE PREFERRED EMBODIMENT

As described at the outset herein, it is a primary objective of the present invention to provide a method and apparatus which will continuously clean a filter means, such as a filter screen, by continuously "sweeping" away particulate matter retained on the filter screen. The specific means to accomplish that primary objective may be appreciated from a consideration of the drawings, and initial attention is directed to FIG. 1 thereof in which an apparatus according to the present invention is generally designated at 10. The apparatus is constructed for effecting clarification of liquid having particulate material entrained initially therewithin from some type of process, and includes, in the embodiment shown in FIG. 1, three side-by-side positioned filter means such as substantially planar filter screens indicated at 12, 14 and 16. Each of the filter screens is substantially identical and each of the filter-cleaning means, to be described hereinafter, is substantially identical and thus only filter screen 12 and the filter-cleaning means associated therewith will now be described.

Figure 2:
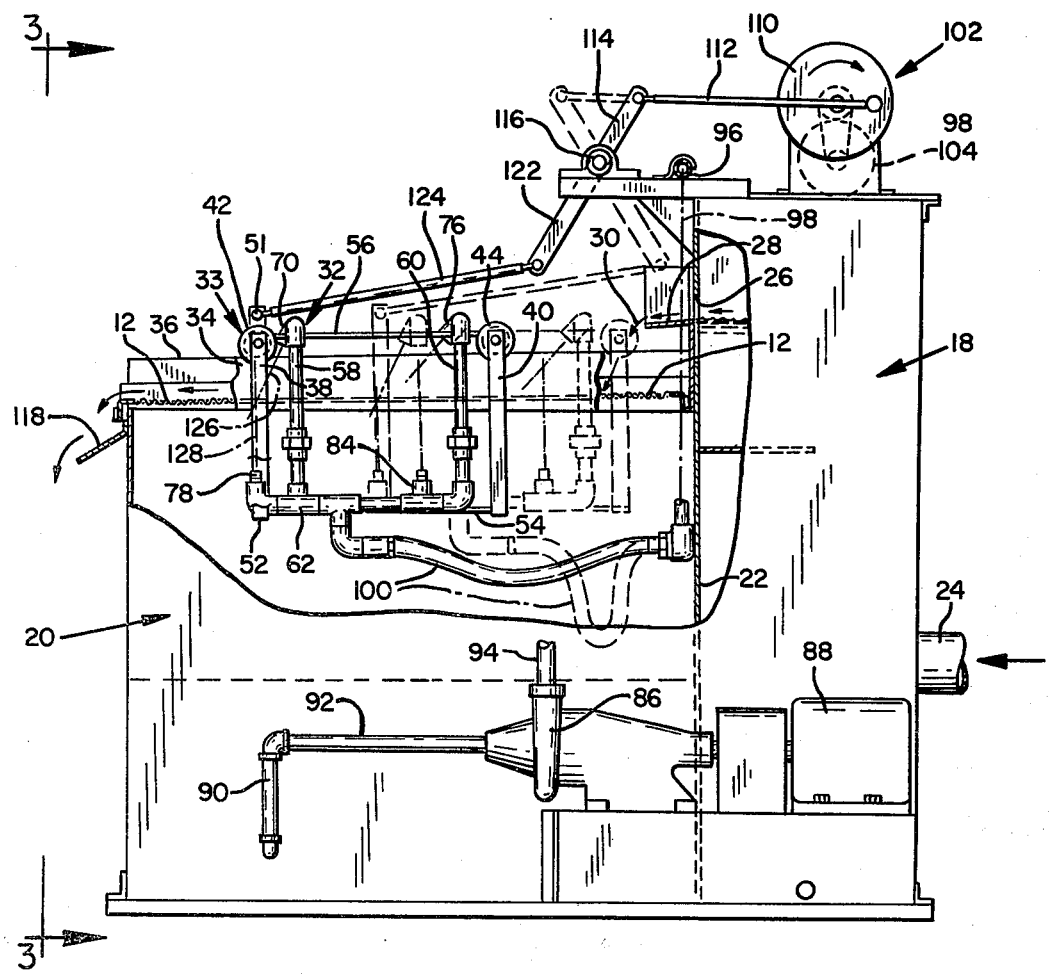
FIG. 2 is a side elevation view, somewhat enlarged, of the apparatus shown in FIG. 1, with certain portions broken away to illustrate in further detail the filter-cleaning means of the present invention.

As shown in FIG. 2, which is a side elevational view of apparatus 10 with portions thereof cut away, filter screen 12 is mounted forwardly of a first reservoir means 18 and above a second reservoir means 20. First reservoir means 18 may be thought of as a tank for receiving particulate-laden liquid with a front wall 22 separating it from second reservoir means 20. An inlet 24 receives contaminated or particulate-laden liquid, such as water from a source, and it is desired to remove the particulate material from the water by filtering same. An opening is indicated at 26 in wall 22, in front of which is mounted an adjustable discharge means or weir indicated at 28. The weir is of conventional construction, and as can be seen it includes an inclined shelf which will direct particulate-laden liquid from first reservoir means 18 downwardly by means of gravity onto filter screen 12. The filter screen extends from a position beneath weir 28 toward a front wall, as illustrated, of second reservoir mean 20.

Figure 3:
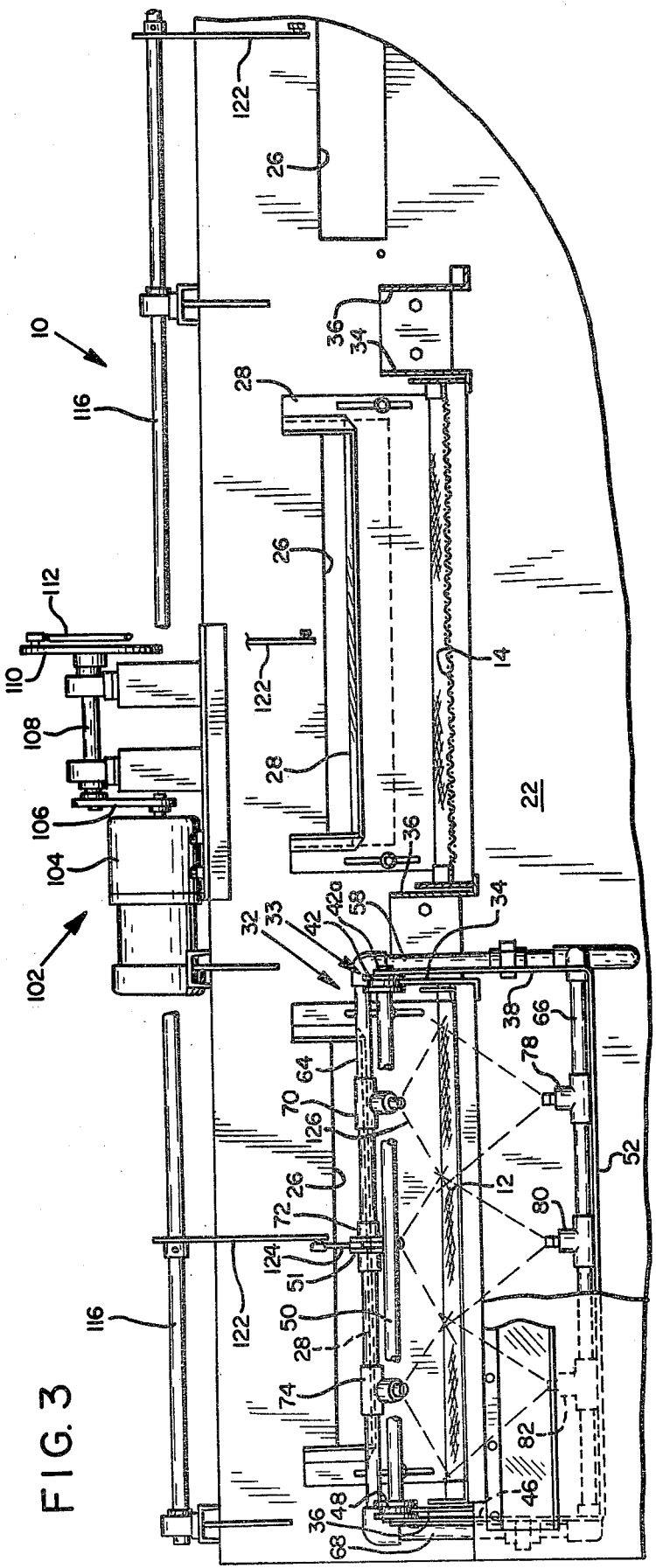
FIG. 3 is a front elevation view of the apparatus of FIG. 1, somewhat enlarged, with portions broken away and deleted to illustrate further features of the filter-cleaning means of the present invention.

As reservoir means 18 is filled with liquid having particulate material entrained therewithin, the liquid is dumped over the weir onto the filter screen substantially along the downwardly inclining path indicated at 30. Another view of the apparatus shown in FIG. 1, from a frontal standpoint, is depicted in FIG. 3. In that figure, viewing the right side thereof, the weir has been deleted to show opening 26. The middle of FIG. 3 also has portions deleted, but illustrates the adjustable positioning of weir 28. To the left of that is pictured weir 28 in operative position above filter screen 12 with a front view of the filter-cleaning means, to be described, also shown.

Returning to FIG. 2, a description of the filtercleaning means, generally indicated at 32, will now be set forth. As mentioned previously the purpose of each filter-cleaning means is to aid in the removal of particulate material from a contaminated liquid. Extending alongside the open, upper portion of first reservoir means 20 are a pair of laterally opposed, upright plate members, such as indicated at 34, 36 which serve to mount cleaning means 32. Explaining further, it can be seen that cleaning means 32 includes a carriage means 33 formed as a open box-like construction adapted for shifting along plate members 34, 36 which may be thought of as tracks. The carriage means includes (see also FIG. 3) upright frame members such as indicated at 38, 40 which extend vertically upright adjacent plate member 34 and are suspended therefrom by roller means such as grooved wheels 42, 44 respectively, which engage the upper surface of plate member 34. Similarly, upright frame members are positioned on the opposite side, adjacent to plate member 36, one of the uprights being indicated at 46 and its associated roller means shown at 48. Viewing FIG. 3, it is to be understood that another roller means and upright are positioned behind upright 36 and roller means 48. Opposed pairs of the roller means, such as indicated at 42 and 48 are innerconnected by means of a nonrotatable bar, such as indicated at 50 connected via pins to the roller means. Each roller means is journaled on an associated pin, such as pin 42a extending through upright 38 and secured rigidly to bar 50. Additionally, opposed pairs of the uprights are interconnected by means of laterally-extending cross members, one of which is shown at 52, and by upper and lower longitudinally-extending interconnecting members, such as indicated at 54, 56.

The carriage means is provided for carrying a dispensing means operable for directing a fluid flow against filter screen 2 to impart movement of retained particulate material relative to the filter screen. To this end, the dispensing means is contemplated as being provided with upper and lower nozzle means innerconnected to a piping network, mounted on the carriage means, for transferring clarified liquid from second reservoir means 20 so that the liquid will be directed against the upper and lower surfaces of filter screen 12. The aforementioned piping network can be initially appreciated from a consideration of FIG. 2 which depicts front and rear risers indicated at 58, 60, respectively, which are interconnected at their lower ends to a conduit 62. Stretching across the top of filter screen 12 from the front and rear risers are laterally extending pipes, one of which is shown in FIG. 3 at 64, the other laterally extending pipe being hidden from view in that figure. Still viewing FIG. 3, it can be seen that another laterally extending pipe 66 extends beneath filter screen 12 and is interconnected to conduit 62. Another riser, indicated at 68, interconnects laterally extending pipe 64 and the pipe which would be opposite to conduit 62.

The purpose of the laterally extending pipes, as described above, is to provide a mount for upper and lower nozzle means arranged in tandem sets. More specifically, from a consideration of FIG. 3, it can be seen that pipe 64 has mounted thereon forward, upper nozzle means such as spray nozzles shown at 70, 72 and 74. Similarly, spray nozzles are mounted above filter means 12 spaced-apart from and behind spray nozzles 70, 72 and 74 substantially aligned therewith, one of the spray nozzles being shown in FIG. 2 at 76.

Mounted beneath filter screen 12 are additional sets of spray nozzles, such as those indicated at 78, 80 and 82 as shown in FIG. 3. It is also to be understood that another set of lower spray nozzles is mounted on a laterally extending lower pipe (hidden from view in FIG. 3), one of which is shown at 84 in FIG. 2. The orientations of lower spray nozzles, such as 78, 80, etc. is one of verticality, i.e., the lower spray nozzles are positioned so as to direct fluid flow substantially vertically upwardly against the bottom of the filter screen for dislodging particulate material which may have become lodged or impacted in the filter screen. In contrast, it is to be recognized that the upper spray nozzles, such as those indicated at 70, 72, etc. are oriented at an angle so as to direct fluid flow obliquely against the upper surface of the filter screen. Before a description of the actual operation and the advantages of the spray nozzle orientations are described, a further description of the means for transferring clarified liquid to the above-described piping network and the mechanism for reciprocating carriage means 33, and the associated dispensing means, will be set forth.

Figure 1:
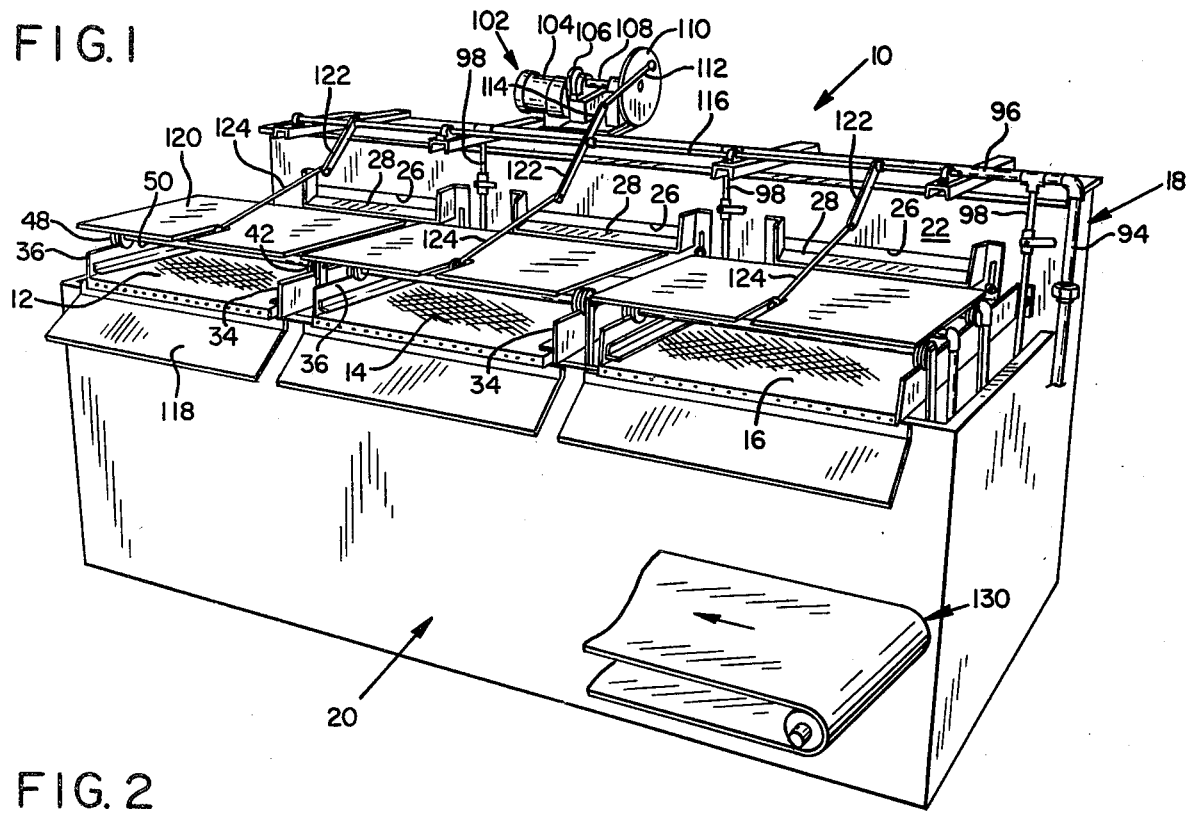
FIG. 1 is a perspective view of an apparatus according to the present invention illustrating what may be thought of as a "cross flow" system utilizing a reservoir for discharging particle-laden liquid onto three side-by-side positioned filter screens, each of which is provided with a filter-cleaning means in accordance with the present invention.

Viewing FIG. 2, it can be seen that a pump 86 operably driven by a motor 88 is provided for transferring clarified liquid from second reservoir means 20 via pipes 90, 92 upwardly through a vertically extending pipe 94 for transfer along a header 96. The header is shown in FIG. 1 but the pump, motor, etc. are not shown for purposes of clarity. The purpose of header 96 is to transfer clarified liquid to each of the dispensing means associated with each filter screen. Isolating the dispensing means associated with filter screen 12, it can be seen from FIGS. 1 and 2 that liquid may be transferred via header 96 downwardly through a conduit 98. The conduit is indicated in dot-dash in FIG. 2 and is mounted adjacent wall 22. Extending from the bottom of conduit 98 is a flexible, tubular hose, such as indicated at 100, which is coupled to the piping network, and specifically conduit 62, carried on carriage means 33. The tubular hose is provided so that liquid may be transferred to the piping network during reciprocal shifting of carriage means 33 by an actuating mechanism which will now be described.

As shown in FIGS. 1–3, actuating mechanism 102 is provided adjacent each carriage means and operatively connected thereto for reciprocating each and thereby the upper and lower spray nozzles back and forth over substantially the entire stretch of each filter screen. More specifically, a motor 104 (see FIG. 3) is operatively connected by means of a belt 106 for driving a shaft 108 which rotates a crank 110. The crank has extending therefrom a rod 112 which is connected to an upper end of a link 114 which is rigidly connected intermediate its ends to a laterally extending rod 116. The laterally extending rod spans across apparatus 10, as shown in FIG. 1, and is suitably journaled in pillow blocks as illustrated. Isolating the mechanism adjacent filter screen 12, it can be seen that a link 122 extends downwardly from rod 116 and is pivotally connected to an actuating arm 124, which in turn, is connected at a distal end thereof to lug 51 connected to the carriage means. Thus, it can be seen that upon operation of motor 104, crank 110 will operate to shift carriage means so that it is operable for selective, reciprocal shifting relative to filter screen 12. As shown in FIG. 2, carriage means 33 is shown in solid outline at the forwardmost extension and in dashed lines at its returned or rearward position.

Prior to a summarizing description of the operation of apparatus 10, and in particular the filter cleaning means of the present invention, a further point must be made with respect to the angular orientation of the upper spray nozzle. Considering initially the angular orientation of the forward spray nozzles, such as those indicated at 70, 72 and 74, it can be seen that they are oriented obliquely to the upper surface of filter screen 12 so that the plane of the downwardly directed spray, such as indicated in the dashed lines at 126 in FIG. 2, impinges slightly behind what would correspond to the upper, planar direction of spray from the lower forward spray nozzles indicated by dashed lines at 128. The angular orientation of the rear, upper spray nozzles, such as spray nozzle 76 may be positioned roughly in the range of 30°–45°, relative to the vertical, as shown. It is also to be noted that filter screen 12 is slightly upwardly tilted from front to rear as shown. The reason for this tilt, which may be roughly in the range of $\frac{1}{4}''$ for every three feet of length of filter screen, is to facilitate the "sweeping away" of particulate material in a manner which will now be described.

In operation, particulate-laden liquid from first reservoir means 18 is transferred over weir 26, which serves as a discharge means, and is directed onto and against filter screen 12. Particulate material entrained within the liquid will then collect or amass on top of the filter screen with clarified liquid falling therethrough for storage in, and subsequent transfer from, second reservoir means 20. As the particulate material collects on filter screen 12, smaller particles may actually become lodged or embedded between the filter screen's meshes or interstices. If sufficient particulate material becomes so embedded, it is obvious that the screen will become clogged and will not serve to permit passage of liquid. Now, it can be appreciated exactly how filter cleaning means 32 of the present invention provides a particularly advantageous manner in cleaning the filter screen. With the upper and lower spray nozzles mounted on carriage means 33, and with operation of pump 86 and actuating mechanism 102, it can be seen that fluid flow, in the form of clarified liquid from second reservoir means 20 will be directed against the filter screen to impart movement of the retained particulate material relative to the filter screen to move the particulate material toward the left, in the view of FIG. 2, for discharge onto a take-away conveyor, such as generally indicated at 130. It will be presumed that filter cleaning means 32 will be positioned initially toward the rear of filter screen 12 as shown in the dashed lines in FIG. 2. With spray being directed from the upper spray nozzles downwardly against the upper surface of filter screen 12, it can be seen that particulate material will be moved toward the left or toward the forward end of the filter screen. Simultaneously, with spray being directed by the lower spray nozzles substantially vertically upwardly against the bottom surface of filter screen 12, any particulate material which may have become lodged in the screen mesh will be driven upwardly and loosened. A continuous action of dislodging impacted material and moving built-up particulate material toward the left will be effected as the carriage means is shifted toward the left in FIG. 2. When the end of the forward travel of the carriage means is reached, the carriage means returns, all the while dislodging impacted material and continuing to sweep particulate material toward the left. As the carriage next shifts from its retracted position forwardly again, this continuously effective cleaning action continues.

Special mention should be made at this point of the relationship of the plane of spray, represented by dashed lines 126 from forward, upper spray nozzles 70, 72 and 74. Specifically, it can be seen that the point of impingement of this spray against filter screen 12 is adjacent to or just slightly behind the point of impingement of the vertically upwardly directed spray from the forward, lower spray nozzles 78, 80 and 82. The reason for configuring the direction of spray as so described is to ensure that material which has been dislodged by virtue of the upwardly directed spray will then be moved subsequently toward the left along filter screen 12 for eventual discharge over a deflecting lip 118 onto conveyor 130. This action will occur regardless of the position of filter cleaning means 32. It may also be advisable to orient the rear, upper spray nozzles, such as that indicated at 76, so that its spray pattern impinges the filter means forwardly of the upwardly directed spray from the rear, lower spray nozzles, such as spray nozzle 84. However, orientation of the spray direction of the rear upper spray nozzles may not be as critical as those for the front upper spray nozzles. Suffice it to say that it has been determined advantageous to have at least one set of the upper spray nozzles, such as the forward ones, oriented with the spray as depicted in FIG. 2. Shields, such as indicated at 120, serve to prevent dislodged particulate material from escaping the desired travel toward the left, as seen in FIG. 2.

Stated in its most essential steps, the method of the present invention contemplates providing a filter means for receiving particulate laden liquid and directing a fluid flow, preferably of clarified water, for impinging against the upper surface of the filter means to effect movement of the particulate material relative to the filter screen. This relative movement is enhanced, i.e., is continuously achieved, by virtue of the fact that the aforementioned impinging step contemplates that the impinging action will occur against the filter means at variable locations thereon. The impinging action will occur continuously as the carriage means is moved or reciprocated across a substantial stretch of the filter means. This continuous movement, caused by fluid flow from the upper spray nozzles will "sweep" particulate matter toward the left or away from the filter means. Concomitantly, upward impingement from the lower spray nozzles, of fluid sprayed substantially verically upwardly, will dislodge any material which may have become clogged in the filter screen. The continuous reciprocal movement of the carriage means, and the spray nozzles carried thereon will ensure that the screen will be repetitively cleaned so that received liquid will be continuously passed through the filter screen for effective clarification.

An attended advantage of the present invention resides in the method step that the fluid which is used to effect the cleaning action is recirculated clarified liquid from the second reservoir means, transferred into the upper and lower spray nozzles.

While actual pressure conditions for dispensing fluid flow from the spray nozzles may depend upon the consistency and size of entrained particulate material, it has been found that spray pressures in the range of 30–80 psi are generally applicable for most situations. Additionally, it has been found that if approximately 70–85% of the filter means or screen is covered by the spray action, effective cleaning of the filter screen will occur. With respect to rates of reciprocation of the carriage means, it has been found that for a wire screen of 200 mesh approximately 36" in length, a stroke of 17½" is more than adequate, assuming that the longitudinal spacing between spray nozzles 70, 72, etc. and 76 is also about 17½". A complete cycle of rear to front and return reciprocation of every four seconds, for a screen having a length of approximately 36" has also been found to be adequate to ensure cleaning of the screen.

There is another important aspect or embodiment of the present invention which may be thought of as an auxiliary device or attachment for use adjacent a filter screen for effecting "dewatering" action. In some applications where it is desired to clarify particulate-laden liquids, it may be the unfortunate result that substantial foaming occurs. For instance, if the particulate matter consists of fibrous material having extractives from organics, such as wood fibers entrained in liquid from a hot water block heating process, foaming action may occur as the particulate material is moved toward the discharge end (see FIG. 2) of filter screen 12. The foam contains excess liquid, and when it is discharged onto a conveying means, such as take-away conveyor 130, a considerable mess may occur. It is undesirable to have liquid discharged onto the take-away conveyor. The overall object of the present invention is to sweep away particulate material from the liquid being cleaned by filter means 12, and if foam is transferred downstream toward the discharge end of filter screen 12, a significant problem in clean-up will result.

Another problem resides in those applications where larger, heavier particles form the particulate material to be removed. These larger particles do not move as easily as smaller ones by spray action. Accordingly, if large particles are to be removed, it may be thought logical to increase the spray pressure or increase the forward extent of travel of carriage means 33 so that the spray from upper spray nozzles 70, 72 and 74 would sweep closer to the discharge end. However, this would result in liquid being transferred over the discharge end, a liquid run-off situation which is undesirable, as outlined above.

Figure 5:
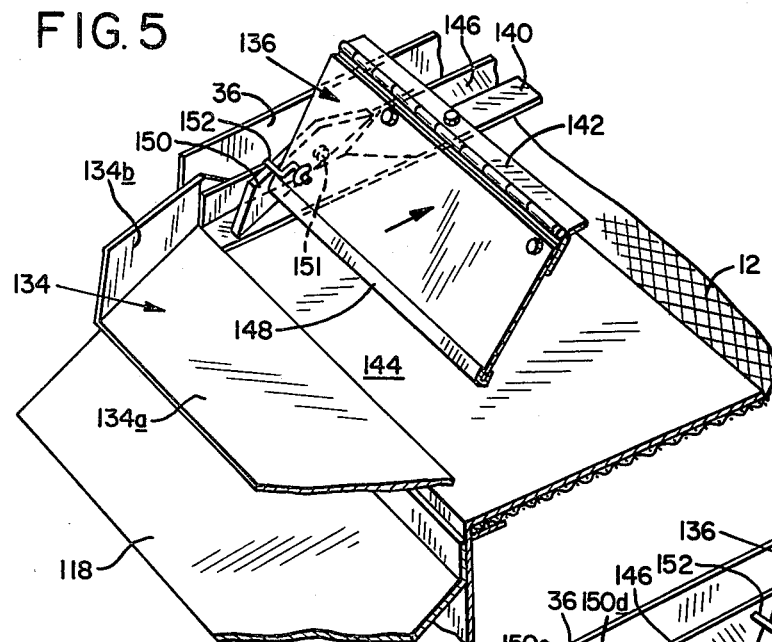
FIGS. 4 and 5 are perspective views, partially broken away, showing a liquid recovery means for returning to the filter means liquid which may move downstream with the particulate material.
Figure 4:
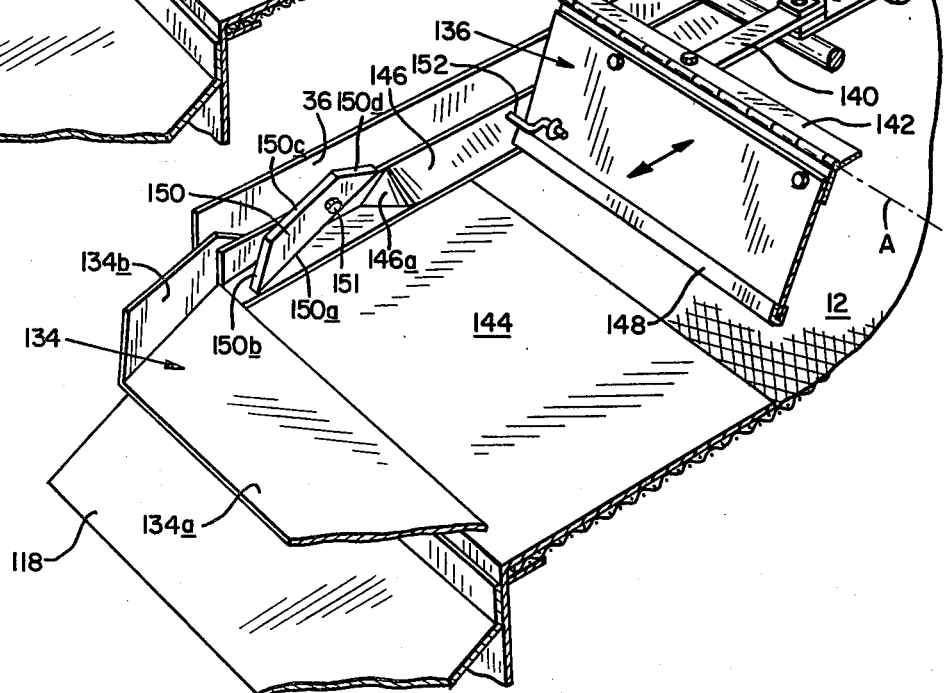

With the above problems in mind, it is an object to provide an auxiliary attachment or device which will in effect "dewater" the resultant mass of foam and particulate material which tends to congregate at the end of the filter screen adjacent the discharge end. To accomplish dewatering action, as well as provide a means for removing heavier particles, a recovery means is utilized adjacent a filter screen for accomplishing return to the filter screen of that liquid which may move downstream with the particulate material toward the discharge end. With attention now directed to FIG. 4, a liquid recovery means, which may be thought of as an auxiliary device including certain components for attaching to the apparatus, is indicated generally at 132 mounted adjacent filter screen 12. The liquid recovery means includes two basic components, namely, an upwardly inclined means 134 extending from the discharge end and a displacement means such as plate means 136. It is to be understood that the apparatus shown in FIGS. 4 and 5 is cut along its length so that only approximately one-half of inclined means 134 and plate means 136 is shown. Plate means 136 is pivotally mounted on carriage means 33 so that it may swing about a horizontal axis indicated at A. Mounting arms or brackets, one of which is indicated at 140, extend from carriage means 33 and provide a mount for a hinge 142, upon which plate means 136 is mounted.

Figure 6:
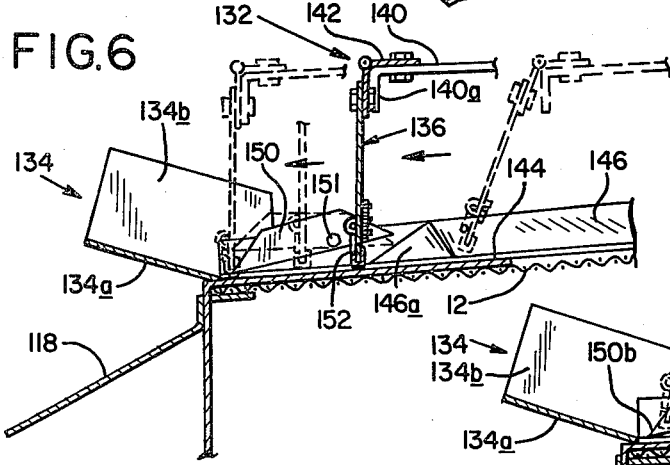
FIGS. 6 and 7 are side views, showing in sequential steps action of the liquid recovering means.

Turning now to a more detailed description of inclined means 134, it can be seen from a consideration of FIG. 6 that it includes an upwardly inclined portion 134a extending outwardly from the discharge end of filter screen 12. Inclined portion may be oriented in the range of about 15° or so from the plane of filter screen 12. Additionally, extending rearwardly toward filter screen 12 and covering a portion thereof is an expanse 144. Inclined means 134 also includes what may be thought of as constriction means such as side members directed inwardly toward the direction of flow, one of which is indicated at 134b, extending inwardly from plate member 36, it being understood that another side member is mounted on the opposite side also directed inwardly. Extending along opposite sides of filter screen 12 are what is referred to as a first biasing means, such as elongate member 146 mounted adjacent plate member 36. Similarly, though hidden, another elongate member is mounted adjacent plate member 34. Each of the elongate members, such as that shown at 146, is inclined inwardly toward filter screen 12 and provides a first biasing means for orienting plate means 136 so that it is swung slightly in a clockwise direction as shown in the dashed line portion at the right side of FIG. 6. Plate means 136 is provided with some type of relatively friction-free bottom bearing such as edge 148 so that as carriage means 33 is shifted from its retracted position (see FIG. 2) to various intermediate positions along elongate member 146, plate means 136 will slide smoothly therealong and be biased so that the bottom of the plate means or expanse 148 is raised above for non-engaging filter screen 12.

Figure 7:
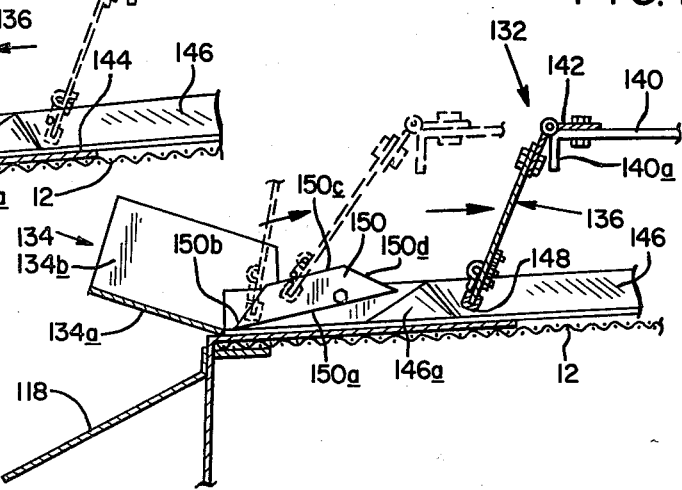

However, it is to be noted that a tapered, transition exit end, such as indicated at 146a, is provided at a predetermined downstream location at the end of each elongate member such as elongate member 146. The effect of the transition exit end is to permit plate means 136 to ride free eventually from elongate member 146 so that it will reorient and pivot about pivot axis A to assume the vertical position such as shown in FIG. 6 in solid outline. A down-turned lip 140a extending from bracket 140 serves as an abutment which prevents further counterclockwise rotation of plate means 136. The purpose of reorienting plate means 136 to the vertical position is so that edge 148 of plate means 136 engages and slides across the top of expanse 144 to move particulate material toward inclined means 134. The net effect is to move this material, which may consist of a substantial mass of foam, up onto inclined portion 134a. As shown in FIG. 6, when plate means 136 approaches the junction between inclined portion 134a and expanse 144, the next step contemplates the return of carriage means 33 without dragging the bottom of plate means 36 rearwardly. To this end, a second biasing means, in the form of a pivotally mounted cam member 150, is provided adjacent one downstream side of plate member 36. As can be seen, cam member 150 is eccentrically pivotally connected as at 151 to plate member 36 and is formed generally as a trapezoid. Further, it is to be noted that a crank arm 152 is pivotally mounted adjacent one edge of plate means 136. The purpose of cam member 150 is to provide a surface over which plate means 136, by means of crank arm 152, can ride so that it can be returned to elongate member 146 during return shifting of carriage means 33. As shown in FIGS. 4 and 7, cam member 150 is provided with a bottom edge 150a, a forward tapered edge 150b, an upper edge 150c and a rear tapered edge 150d.

Operation of liquid recovery means 132 for returning liquid to the filter means will now be described. Initially, it will be presumed that carriage means 33 is positioned in its returned position shown in FIG. 2 to the right thereof. In this orientation, plate means 136 will be angled slightly away from the vertical, in a clockwise direction such as shown in FIG. 6 except that it will be more toward the rear of filter screen 12. As carriage means 33 is shifted forwardly with the spray action from the upper and lower nozzles being actuated, particulate material on filter screen 12 will be swept toward the left or toward the discharge end. During this forward movement of carriage means 33, plate means 136 will slide freely, by virtue of edge 148, along the first biasing means such as elongate member 146 above filter screen 12. When plate member 136 begins to engage tapered end 146a, it will be permitted to shift toward the vertical such as shown in the solid outline in FIG. 6. Next, the lower arm portion of crank arm 152, slips or hooks beneath cam member 150 and eventually engages bottom edge 150a to lift the cam member (see dashed outline of cam member) as plate means 136 is advanced toward the discharge end.

As shown in the dashed outline to the left of FIG. 6, plate means 36 has moved to its furthest extent to the left, and at this point crank arm 152 exits from the end of bottom edge 150a of cam member 150 to permit the cam member to fall downwardly to the position shown in solid outline in FIGS. 6 and 7. However, during the period at which plate means 136 was disposed substantially vertically, it moves the particulate material which may have a substantial foam component up inclined means 134. As the mass of foam material is moved up inclined means 134, it will become concentrated together and compressed because of the inwardly tapering side members such as side member 134b and the continuing receipt of more material during reciprocation of carriage means 33. During this subsequent movement of particulate material up the inclined surface, compression of the material occurs which tends to "squeeze" or "wring out" the liquid from the foam or sludge. The liquid will then tend to return by gravity back toward filter screen 12 so that it may be dispensed back into second reservoir means 20.

Upon the reciprocal return of carriage means 33, it can be seen that as crank arm 152 begins to ride up over edge 150b of cam 150, plate means 136 is elevated so that it will not drag along plate expanse 144, as shown in FIGS. 5 and 7. As shown in the middle dashed portion of FIG. 7, the lower arm portion of pin 152 is riding up along upper edge 150c of cam member 150 for eventual engagement with tapered edge 150d. At that point, the weight of plate means 136 will cause cam member 150 to pivot about pivot connection 151 so that edge 148 will transition smoothly onto end 146a of elongate member 146 to thereby slide onto the elongate member for return to the position shown to the right in FIG. 2.

What has been described above is an auxiliary device for "dewatering" or removing excess liquid which may take the form of foam. By continuously displacing foam material into a station at the discharge end wherein the foam material is compressed to force water therefrom, the water or liquid may be returned to filter means 12. Heavier particles may also be moved toward the discharge end. Thus, as the particulate material exits over the end edge of inclined means 134, it will be substantially free of excess liquid.

While the present invention has been described with reference to the foregoing preferred embodiment, it will be apparent that other changes in form and detail may be made therein by those having ordinary skill in the art which will fall within the scope of the invention as set forth in the independent claims.

It is claimed and desired to secure by Letters Patent:

1. Apparatus for effecting clarification of liquid having particulate material entrained therewithin comprising:

filter means sized for passing the liquid therethrough while retaining the particulate material;

discharge means operable for directing the particulate-laden liquid against said filter means;

filter-cleaning means disposed adjacent said filter means including a dispensing means mounted on a carriage means operable for selective, reciprocal shifting relative to said filter means, said dispensing means being operable for directing a fluid flow against the filter means to impart movement of the retained particulate material relative to said filter means toward a downstream discharge end thereby removing the particulate material from said filter means and cleaning same;

liquid recovery means for returning to said filter means that liquid which may move downstream with the particulate material toward said discharge end, said liquid recovery means being defined by inclined means mounted adjacent said discharge end and displacement means defined by a plate means mounted on and extending forwardly from said carriage means operable for moving the particulate material toward said inclined means, said inclined means being inclined upwardly from said discharge end, and wherein a nonscreening expanse of predetermined length extends rearwardly from said inclined means; and said plate means being mounted on said carriage means for nonengaging said filter means during carriage means reciprocation, said plate means also being mounted on said carriage means for slidably engaging said expanse during a predetermined length of shifting of said carriage means toward said inclined means and nonengaging said expanse during retraction of said carriage means from said inclined means.

2. The apparatus of claim 1 further including first biasing means disposed adjacent said filter means for orienting said plate means into position for nonengaging said filter means during reciprocation of said carriage means.

3. The apparatus of claim 2 wherein said first biasing means includes transition means for reorienting said plate means into position for slidably engaging said expanse during forward shifting of said carriage means when said plate means is disposed over said expanse.

4. The apparatus of claim 3 wherein said first biasing means is defined by at least one elongate member disposed adjacent a lateral side of said filter means for contacting said plate means.

5. The apparatus of claim 4 wherein said plate means is pivotally mounted on said carriage means for pivotal movement about a substantially horizontal pivot axis, said elongate member of said first biasing means being disposed for contacting said plate means to pivot same from a vertical orientation when said plate means is disposed above said filter means to a nonvertical position.

6. The apparatus of claim 5 further including second biasing means positioned adjacent said discharge end for pivoting said plate means about said pivot axis during return shifting of said carriage means when said plate means is disposed over said expanse.

7. The apparatus of claim 6 wherein said second biasing means is pivotally mounted generally along a lateral side of said expanse.

8. The apparatus of claim 7 wherein said second biasing means is defined by a cam member.

9. The apparatus of claim 8 wherein said cam member is formed generally in a trapezoidal configuration.

10. The apparatus of claim 9 wherein said cam member is oriented for pivoting by said plate means when said plate means travels in a forward direction toward said discharge end over said expanse, said cam member receiving and pivoting said plate means during retraction of same over said expanse for elevating thereby said plate means relative to said expanse.

* * * * *